United States Patent [19]

Carter et al.

[11] Patent Number: 5,723,100
[45] Date of Patent: Mar. 3, 1998

[54] URANIUM OXIDE PRODUCTION

[75] Inventors: Robert Carter; John Terry Semeraz, both of Warrington, United Kingdom

[73] Assignee: British Nuclear Fuels plc, Warrington, England

[21] Appl. No.: 592,337

[22] PCT Filed: Jun. 2, 1995

[86] PCT No.: PCT/GB95/01281

§ 371 Date: Mar. 7, 1995

§ 102(e) Date: Mar. 7, 1995

[87] PCT Pub. No.: WO95/33689

PCT Pub. Date: Dec. 14, 1995

[30] Foreign Application Priority Data

Jun. 3, 1994 [GB] United Kingdom ............... 9411096.2

[51] Int. Cl.⁶ ...................................................... C01G 43/025
[52] U.S. Cl. ........................... 423/261; 252/643; 264/0.5
[58] Field of Search ........................... 423/261; 252/643; 264/0.5

[56] References Cited

U.S. PATENT DOCUMENTS

| | | |
|---|---|---|
| 3,765,844 | 10/1973 | Rode ........................................ 423/19 |
| 3,906,081 | 9/1975 | Welty ...................................... 423/261 |
| 3,978,194 | 8/1976 | Knudsen et al. ....................... 423/261 |
| 4,112,055 | 9/1978 | Artaud .................................... 423/261 |
| 4,397,824 | 8/1983 | Butler et al. ........................... 423/260 |
| 4,830,841 | 5/1989 | Urza ....................................... 423/261 |
| 4,963,294 | 10/1990 | Yato et al. ............................. 252/636 |
| 5,066,429 | 11/1991 | Larson et al. ......................... 264/0.5 |

FOREIGN PATENT DOCUMENTS

| | | |
|---|---|---|
| 0148707 | 7/1985 | European Pat. Off. |
| 0230087 | 7/1987 | European Pat. Off. |
| 1280865 | 7/1972 | United Kingdom. |
| 1281508 | 7/1972 | United Kingdom. |
| 1536239 | 12/1978 | United Kingdom. |

Primary Examiner—Charles T. Jordan
Assistant Examiner—John R. Hardee
Attorney, Agent, or Firm—Sheridan Ross P.C.

[57] ABSTRACT

A process for the production of a uranium oxide in which $UF_6$ is converted by reaction with steam into $UO_2F_2$ in a first step and by further reaction of $UO_2F_2$ with steam and/or hydrogen in a second step to produce an oxide of uranium, the process being carried out in an apparatus comprising a single kiln vessel having a first region, having $UF_6$ and steam inlets, wherein the fast step may be carried out, and a second region wherein the said second step may be carried out, which process includes the further steps of analysing the oxide of uranium produced to determine the mount of fluoride present and the oxygen to uranium (O/U) ratio therein, and, where the level of fluoride present is unacceptably high, recycling the oxide of uranium to the said second region to produce an oxide of uranium having a lower fluoride content and oxygen to uranium ratio and wherein the said oxide of uranium having the unacceptably high fluoride content is fed into the first region of the vessel, in the absence of any feeding of $UF_6$ or steam thereto, and conveyed by conveying means directly into the second region of the vessel.

17 Claims, 1 Drawing Sheet

URANIUM OXIDE PRODUCTION

FIELD OF THE INVENTION

This invention relates to the production of oxides of uranium, in particular the production of uranium dioxide ($UO_2$).

BACKGROUND OF THE INVENTION

The production of ceramic grade $UO_2$ powder is an important part of the nuclear fuel cycle. Ceramic grade $UO_2$ has been produced for many years by a variety of methods.

A number of known methods for the production of ceramic grade $UO_2$ utilise fluidised bed reactors and other reaction vessels connected in series to convert uranium hexafluoride ($UF_6$) sequentially into uranyl fluoride ($UO_2F_2$) and subsequently $UO_2F_2$ into $UO_2$. In these methods the reactants and products are sequentially passed from vessel to vessel on a once through basis. Such methods are described in Patent Specifications GB 1280865, GB 1281508, GB 1536239 and EP 0230087A.

In one particularly successful method for the production of ceramic grade $UO_2$, $UF_6$ is converted directly into $UO_2$ by reaction with a gaseous mixture of steam and hydrogen in a single stage kiln process. In carrying out the process, an inclined rotating barrel type kiln is employed. An inlet chamber comprising a filter hopper is connected to the upper end (gas outlet end) of the kiln barrel and this inlet chamber forms the first region of the single process vessel. The barrel of the kiln forms the second region of the vessel. The kiln is operated with counter-current gas solids flow.

$UF_6$ is vaporised and metered into the inlet chamber where it reacts with steam at a jet in a zone at the base of the filter hopper at the gas outlet end of the kiln. The reaction of $UF_6$ and steam produces a solid intermediate product of $UO_2F_2$ which passes into the kiln by means of a scroll feeder. In the kiln the $UO_2F_2$ is pyrohydrolysed and reduced by a countercurrent stream of steam and hydrogen, fed into the lower end (powder discharge end) of the kiln barrel, to form ceramic grade $UO_2$ powder which is discharged from the lower end of the kiln.

The required product quality is achieved by controlling the kiln temperature in three temperature zones, to an appropriate profile in the range 500°–800° C. The $UO_2$ powder produced by the process typically has an oxygen to uranium (O/U) ratio of about 2.05, a mean specific surface area (SSA) of approximately 2.7 $m^2/g$, and a fluorine impurity level of around 25 ppm on a uranium weight basis.

However, even in a successful process such as that described above, on rare occasions a small quantity of product $UO_2$ may be out of the desired specification range. We have found that the out of specification $UO_2$ can often have a higher than acceptable fluoride content and a higher than acceptable O/U ratio. This impurity is usually in the form of uranyl fluoride ($UO_2F_2$), such a product being referred to as "high fluoride $UO_2$".

For a given process, any out of specification product can often represent a significant cost with no benefit and it is therefore desirable that this cost be reduced.

A known process for recycling out of specification $UO_2$ to a $UF_6$ conversion process is described in Patent Specification EP 0148707A. In this process out of specification $UO_2$ is re-fed into a kiln type $UF_6$ conversion apparatus at the same time as $UF_6$ is being fed to the apparatus to produce 'fresh' $UO_2$. Such a process necessitates close control of operating parameters and involves careful adjustment of the input quantities of reagents in order to obtain a constant output from the reaction vessel. One disadvantage of operating in this way is that the recycling of the out of specification material could interfere with the main $UF_6$ converion reaction and thereby produce further out of specification material. An additional disadvantage is the use of screw feeders outside the reaction vessel to convey the material to be recycled into the reaction vessel as this can lead to operational problems including the need for increased maintenance.

SUMMARY OF THE INVENTION

According to the present invention there is provided a process for the production of a uranium oxide in which $UF_6$ is converted by reaction with steam into $UO_2F_2$ in a first step and by further reaction of $UO_2F_2$ with steam and/or hydrogen in a second step to produce an oxide of uranium, the process being carried out in an apparatus comprising a single kiln vessel having a first region, having $UF_6$ and steam inlets, wherein the first step may be carried out, and a second region wherein the said second step may be carried out, which process includes the further steps of analysing the oxide of uranium produced to determine the amount of fluoride present and the oxygen to uranium (O/U) ratio therein, and, where the level of fluoride present is unacceptably high, recycling the oxide of uranium to the said second region to produce an oxide of uranium having a lower fluoride content and oxygen to uranium ratio and wherein the said oxide of uranium having the unacceptably high fluoride content is fed into the first region of the vessel, in the absence of any feeding of $UF_6$ or steam thereto, and conveyed by conveying means directly into the second region of the vessel.

The said oxide of uranium may be uranium dioxide.

Preferably, the product of the $UF_6$ conversion may be collected from the vessel in batches using suitable containers such as drums.

Desirably, each batch of product collected from the vessel may be analysed for its fluorine content and O/U ratio by standard analytical means so as to identify batches which may have an unacceptably high fluoride content and O/U ratio.

Advantageously, batches of product having an unacceptably high fluoride content and O/U ratio may be re-fed to the kiln vessel, the vessel having first been suitably modified to accommodate the re-feeding of the high fluoride product, for example, by removing the $UF_6$ and steam inlets required for the first step in the aforementioned conversion process.

Conveniently, the product having the high fluoride content and O/U ratio may be re-fed to the first region of the vessel from a powder transport line using an inert carrier gas such as nitrogen.

The out of specification product may be fed to the transport line by means of a parallel feeding system which may comprise two feed hoppers.

Conveniently, the product having the high fluoride content and O/U ratio may be conveyed from the first region of the vessel into the second region by means of a rotatable scroll feeder.

In an alternative approach, batches of product having an unacceptably high fluoride content and O/U ratio may be re-fed to the kiln vessel without first removing the $UF_6$ and steam inlets, by means of a suitable powder feeding arrangement which may include a screw feeder or other means which may be well known to those skilled in the art of powder handling.

Surprisingly and beneficially we have found that $UO_2$ having an unacceptably high fluoride content and O/U ratio, such as that which may be produced from time to time in a single stage kiln process for the direct conversion of $UF_6$ into ceramic grade $UO_2$, can be re-fed to such a kiln and can be defluorinated so as to give a product with an acceptably low fluoride content and O/U ratio and a negligible change in specific surface area. This has the effect of reducing the overall operating costs of the said single stage kiln process by recycling any out-of-specification product having an unacceptably high fluoride content and O/U ratio to the kiln vessel to obtain a product of the required quality. The recycled product has acceptable sintering characteristics for use in the production of nuclear fuel pellets.

A further advantage of recycling high fluoride $UO_2$ back through the aforementioned kiln vessel is that it eliminates the need for costly retreatment furnaces or wet chemical plant. Hence, the need for a separate recovery facility for out of specification $UO_2$ is eliminated.

Compared with the prior art recycling process, the process of the present invention can be carried out at lower capital cost using relatively less complicated equipment. For example, the feed out of specification material is simplified in an embodiment of the present invention by using vacuum and gas transport systems for conveying powders, thereby removing the reliance on screw feeders which can often prove problematic in operation. By re-feeding the out of specification material to the reaction vessel when the feeds of $UF_6$ and steam to the first region of the vessel have been shut off, the control of the recycling process is simplified and the main $UF_6$ conversion reaction is not interfered with.

Embodiments of the present invention will now be described, by way of example only, with reference to the accompanying drawing.

DESCRIPTION OF THE INVENTION

Figure 1:
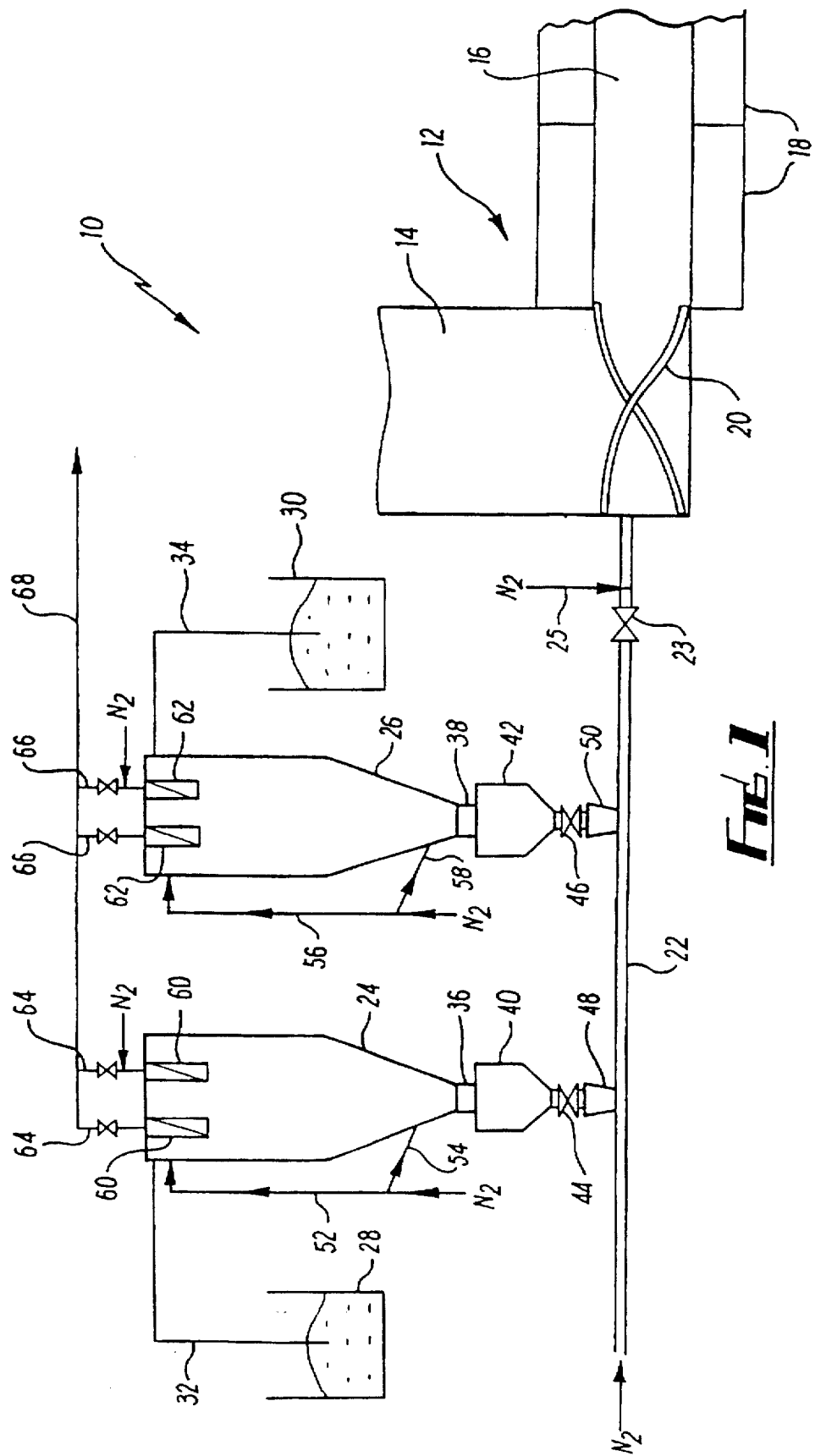
FIG. 1 is a diagrammatic front elevation of part of an apparatus for the defluorination of high fluoride $UO_2$.

Referring to FIG. 1 an apparatus 10 for the defluorination of high fluoride $UO_2$ powder is shown having a process vessel 12. The process vessel 12 has two regions: an inlet chamber 14 comprising a filter hopper (the filters are not shown) which forms the first region, and an inclined rotating barrel type kiln 16 which forms the second region, the upper end (inlet end) of the barrel of the kiln 16 being connected to the inlet chamber 14. The barrel of the kiln 16 is surrounded by three zone heaters 18 (two are shown). The lower end (discharge end) of the kiln 16 (not shown) has inlets for hydrogen and superheated steam and an outlet for processed powder. A rotatable scroll feeder 20 is located at the bottom of the inlet housing 14.

The inlet housing 14 is connected to one end of a transport line 22, the line 22 being connected at its other end to a source of nitrogen gas (not shown). The pressure of nitrogen in the transport line 22 is 1 bar. Two $UO_2$ feed hoppers 24, 26 are connected to the transport line 22 and are located at points intermediate to the nitrogen source and the inlet housing 14. The transport line 22 has an isolation ball valve 23 located close to the inlet housing 14 and between the ball valve 23 and the housing 14 there is a 300 m bar nitrogen purge line 25.

The feed hopper 24 is connected to a source 28 of high fluoride $UO_2$ via a line 32. The discharge end 36 of the hopper 24 is connected to a feeder 40 which is in turn connected to a reducing piece 48 via a ball valve 44. The reducing piece 48 is connected to the transport line 22. The hopper 24 is connected to a source (not shown) of purge nitrogen, at a pressure of 1 bar via lines 52 and 54 which respectively admit the purge gas to the top and bottom regions of the hopper 24. A pair of carbon filters 60 are located a the top of the hopper 24. Filtered gas leaves the hopper 24 via the filters 60 and lines 64 which connect with an extraction line 68.

The feed hopper 26 is connected to a source 30 of high fluoride $UO_2$ via a line 34. The discharge end 38 of the hopper 26 is connected to a feeder 42 which is in turn connected to a reducing piece 50 via a ball valve 46. The reducing piece 50 is connected to the transport line 22. The hopper 26 is connected to a source (not shown) of purge nitrogen, at a pressure of 1 bar, via lines 56 and 58 which respectively admit the purge gas to the top and bottom regions of the hopper 26. A pair of carbon filters 62 are located at the top of the hopper 26. Filtered gas leaves the hopper 26 via the filters 62 and lines 66 which connect with the extraction line 68.

In operation of the apparatus 10, the feed hopper 24 is initially filled with high fluoride $UO_2$ powder. The powder is fed from the discharge end 36 of the hopper 24, through the feeder 40 to the transport line 22 via the open ball valve 44 and the reducing piece 48. In the transport line 22 the powder is conveyed to the inlet housing 14 by the 1 bar nitrogen gas flow from the nitrogen gas source. The powder passes through the isolation ball valve 23 and is fed directly into the scroll feeder 20 in the inlet housing 14. The scroll feeder 20 delivers the $UO_2$ powder into the upper end (inlet end) of the barrel of the kiln 16. As the barrel of the kiln 16 rotates the powder is moved towards the discharge end of the kiln 16 and is contacted with a countercurrent flow of hydrogen and superheated steam which are admitted via their respective inlets at the discharge end of the kiln 16. The temperature of the kiln 16 is controlled in three zones (namely feed zone, middle zone and discharge zone) in the range 450°–800° C. by means of the three zone heaters 18. The high fluoride $UO_2$ is defluorinated in the countercurrent gas stream according to the reactions:

$$UO_2F_2 + H_2O \rightarrow UO_3 + 2HF \quad \text{1} \tag{1}$$

$$UO_3 + H_2 \rightarrow UO_2 + H_2O \tag{2}$$

The defluorinated $UO_2$ powder is discharged from the lower end of the kiln 16.

The process produces off gases which consist of excess hydrogen, carrier nitrogen, hydrogen fluoride gas and steam. These gases are filtered by the filters (not shown), housed in the filter hopper 14, to remove entrained $UO_2$. The hydrogen fluoride is removed in a suitable scrubber, such as a caustic scrubber, and the remaining gases are released to atmosphere via a flame trap.

When high fluoride $UO_2$ is being fed to the process vessel 12 from feed hopper 24, feed hopper 26 is filled with high fluoride $UO_2$ from the source 30 via the line 34. The ball valve 46 is in a closed position to isolate the hopper 26 from the transport line 22. As the hopper 24 becomes empty, the valve 44 is closed and valve 46 is opened to allow powder to be fed to the process vessel 12 from feed hopper 26. Feed hopper 24 is then refilled with a further high fluoride $UO_2$ from the source 28 via the line 32. By utilising the two feed hoppers 24, 26 in this way, the process may be operated either in a batchwise manner or in a continuous manner.

In an alternative system (not shown) for the defluorination of high fluoride $UO_2$, a single stage kiln of the type used for the direct conversion of $UF_6$ into ceramic grade $UO_2$, can be used. In this type of kiln, which is described above, a $UF_6$ and steam jet system is present in the inlet chamber, although the $UF_6$ and steam feeds are switched off, and, as a consequence, an alternative arrangement for feeding high fluoride $UO_2$ powder into the kiln is necessary. A suitable powder feeding system may include a screw feeder to deliver the high fluoride $UO_2$ directly into the kiln barrel.

Specific examples of the use of the apparatus 10, as shown in the Figure, are as follows:

EXAMPLE 1

In the manner described above, $UO_2$ powder produced by the process described above and having a fluoride content of 9000 ppm was fed into the process vessel 12. The nitrogen flow rate in the transport line 22 was 15 m$^3$/hr giving an average powder feed rate of 18.1 kg/hr. The rotational speed of the kiln 16 was maintained at 5 rpm and the temperature profile of the kiln barrel was such that the temperatures of the feed zone, the middle zone and the discharge zone were in the range of 500°–800° C. Steam was fed to the discharge end of the kiln at a flow rate of 15 kg/hr and hydrogen was similarly fed at a flow rate of 9.0 m$^3$/hr. Defluorinated $UO_2$ powder was collected from the discharge end of the kiln in batches of approximately 25 kg which were analysed for fluoride content, specific surface area (SSA), and oxygen/uranium ratio (O/U). The results are summarised in Table 1 as follows:

TABLE 1

| Batch No. | F Content (ppm) | SSA (m²/g) | O/U Ratio |
| --- | --- | --- | --- |
| 1 | 50 | 2.5 | 2.05 |
| 2 | 20 | 2.6 | 2.04 |
| 3 | 20 | 2.5 | 2.04 |
| 4 | 20 | 2.6 | 2.04 |
| 5 | 20 | 2.5 | 2.03 |
| 6 | 60 | 2.7 | 2.03 |
| 7 | 20 | 2.4 | 2.03 |
| 8 | 30 | 2.5 | 2.03 |
| 9 | 30 | 2.5 | 2.02 |
| 10 | 25 | 2.5 | 2.02 |
| 11 | 35 | 2.4 | 2.03 |
| 12 | 20 | 2.5 | 2.03 |
| 13 | 20 | 2.3 | 2.02 |
| 14 | 20 | 2.8 | 2.02 |
| 15 | 20 | 2.7 | 2.02 |
| 16 | 20 | 2.4 | 2.03 |
| 17 | 20 | 2.5 | 2.03 |
| 18 | 20 | 2.5 | 2.02 |
| 19 | 20 | 2.5 | 2.03 |
| 20 | 40 | 3.4 | 2.01 |

In Table 1 SSA and O/U ratio are as defined above.

EXAMPLE 2

$UO_2$ powder having a fluoride content of 2700 ppm was fed to the process vessel as before at an average powder feed rate of 19.0 kg/hr. Hydrogen was fed to the discharge end of the kiln at a flow rate of 6 m$^3$/hr. All other conditions were identical to those of Example 1. Batches of the discharged $UO_2$ powder were analysed as before and the results are summarised in Table 2 as follows:

TABLE 2

| Batch No. | F Content (ppm) | SSA (m²/g) | O/U Ratio |
| --- | --- | --- | --- |
| 1 | 25 | 2.5 | 2.03 |
| 2 | 20 | 2.5 | 2.09 |
| 3 | 20 | 2.5 | 2.04 |
| 4 | 20 | 2.5 | 2.03 |
| 5 | 20 | 2.2 | 2.03 |
| 6 | 20 | 2.4 | 2.02 |
| 7 | 20 | 2.5 | 2.02 |
| 8 | 20 | 2.4 | 2.02 |
| 9 | 20 | 2.5 | 2.03 |
| 10 | 20 | 2.5 | 2.04 |
| 11 | 20 | 2.5 | 2.04 |
| 12 | 20 | 2.4 | 2.03 |
| 13 | 20 | 2.5 | 2.03 |
| 14 | 20 | 2.6 | 2.03 |
| 15 | 20 | 2.5 | 2.03 |
| 16 | 20 | 2.7 | 2.03 |
| 17 | 20 | 2.4 | 2.03 |
| 18 | 20 | 2.5 | 2.03 |

In Table 2 SSA and O/U ratio are as in Table 1.

EXAMPLE 3

$UO_2$ powder having a fluoride content of 750 ppm was fed to the process vessel as described above at an average powder feed rate of 19.9 kg/hr. The kiln temperature profile was identical to that of Example 1 and all other conditions were identical to those of Example 2. The results of the analysis of the discharged $UO_2$ powder are summarised in Table 3.

TABLE 3

| Batch No. | F Content (ppm) | SSA (m²/g) | O/U Ratio |
| --- | --- | --- | --- |
| 1 | 55 | 2.6 | 2.07 |
| 2 | 20 | 2.4 | 2.05 |
| 3 | 20 | 2.1 | 2.01 |
| 4 | 20 | 2.6 | 2.03 |
| 5 | 20 | 2.5 | 2.03 |
| 6 | 20 | 2.6 | 2.04 |
| 7 | 20 | 2.2 | 2.04 |
| 8 | 20 | 2.7 | 2.03 |
| 9 | 20 | 2.4 | 2.14 |
| 10 | 20 | 2.6 | 2.03 |
| 11 | 20 | 2.5 | 2.02 |
| 12 | 20 | 2.5 | 2.02 |
| 13 | 20 | 2.6 | 2.02 |
| 14 | 20 | 2.6 | 2.02 |
| 15 | 20 | 2.6 | 2.17 |

In Table 3 SSA and O/U ratio are as in Table 1.

The results of Examples 1 to 3 demonstrate that high fluoride $UO_2$, such as that which may be produced from time to time in a single stage kiln process for the direct conversion of $UF_6$ into ceramic grade $UO_2$, can be refed to such a kiln and can be defluorinated so as to give a product with a low fluoride content and an acceptable oxygen to uranium ratio with a negligible change in specific surface area. Further trials have shown that the defluorinated $UO_2$ powder has acceptable sintering characteristics for use in the production of nuclear fuel pellets.

We claim:

1. In a process for the production of a uranium oxide in which $UF_6$ is converted by reaction with steam into $UO_2F_2$ in a first step and by further reaction of $UO_2F_2$ with at least one of steam and hydrogen in a second step to produce an oxide of uranium, the process being carried out in an apparatus comprising a single kiln vessel having a first region, having UF$_6$ and steam inlets, wherein the first step may be carried out, and a second region wherein the said second step may be carried out, which process includes the further steps of (a) analyzing the oxide of uranium produced to determine a characteristic thereof, the improvement comprising:

(b) where the characteristic is unacceptable, recycling the oxide of uranium to the said second region to produce an oxide of uranium having a lower fluoride content and oxygen to uranium ratio by feeding said material into the first region of the vessel, in the absence of any feeding of UF$_6$ or steam thereto, and by conveying said material by conveying means directly into the second region of the vessel, wherein the characteristic is at least one of the fluoride content and oxygen to uranium (O/U) ratio.

2. A process as in claim 1 and wherein the oxide of uranium is uranium dioxide.

3. A process as in claim 1 and wherein the product of the UF$_6$ conversion is collected from the vessel in batches using suitable containers such as drums.

4. A process as in claim 3 and wherein each batch of product collected from the vessel is analyzed for its fluoride content and O/U ratio by standard analytical means.

5. A process as in claim 1 and wherein the vessel is modified by removing the UF$_6$ and steam inlets required for the first step in the aforementioned conversion process.

6. A process as in claim 1 and wherein the product having unacceptably high fluoride content and O/U ratio is re-fed to the vessel from a powder transport line using an inert carrier gas such as nitrogen.

7. A process as in claim 6 and wherein the said product is fed to the transport line by means of a parallel feeding system comprising two hoppers.

8. A process as in claim 1 and wherein the said product is conveyed from the first region of the vessel into the second region by means of a rotatable scroll feeder.

9. A process as in claim 1 and wherein batches of product having an unacceptably high fluoride content and O/U ratio are re-fed to the kiln vessel, without first removing the UF$_6$ and steam inlets, by means of a suitable powder feeding arrangement including a screw feeder.

10. In a process for producing uranium oxide, comprising (a) contacting a feed material comprising UF$_6$ with an oxidizing agent to form a product comprising uranium oxide; (b) analyzing the product to determine a characteristic of the product; (c) comparing the characteristic to a predetermined characteristic, a process of reducing the fluoride content or the oxygen-to-fluoride ratio comprising:

(d) further contacting the product with the oxidizing agent to further oxidize the product, wherein steps (a) and (d) are conducted in the same reactor, wherein the oxidizing agent is H$_2$O and wherein in step (d) the further contacting of the product with the oxidizing agent is performed in the second region of the reactor, and wherein the characteristic is at least one of an amount of fluoride and oxygen to uranium ratio and the predetermined characteristic is at least one of a predetermined amount of fluoride and predetermined oxygen to uranium ratio.

11. A process as in claim 10, wherein the oxidizing agent is H$_2$O and wherein step (a) comprises:

first contacting the feed material comprising UF$_6$ with H$_2$O to form an intermediate product comprising UO$_2$F$_2$ in a first region of a reactor and second contacting the intermediate product with H$_2$O and hydrogen to produce the product comprising uranium dioxide.

12. A process as in claim 11, wherein the first region of the reactor has a first reaction temperature and the second region of the reactor has a second reaction temperature and the first reaction temperature is different from the second reaction temperature.

13. A process as in claim 10, wherein the predetermined amount of fluoride is no more than about 25 ppm.

14. A process as in claim 10, wherein the predetermined ratio is no more than about 2.05.

15. In a process for the production of a uranium oxide in which UF$_6$ is converted by reaction with an oxidizing agent into UO$_2$F$_2$ in a first step and by further reaction of UO$_2$F$_2$ with an oxidizing agent and optionally a reducing agent in a second step to produce a product comprising uranium dioxide, the process being conducted in a single vessel having a first region in which UF$_6$ is converted into UO$_2$F$_2$ and a second region in which UO$_2$F$_2$ is converted into uranium dioxide, the improvement comprising:

(a) analyzing the product to determine the amount of fluoride in the product and the oxygen-to-uranium ratio;

(b) comparing the amount of fluoride and the oxygen-to-uranium ratio to a predetermined amount of fluoride and a predetermined oxygen-to-uranium ratio, respectively; and (c) when at least one of (i) the amount of fluoride exceeds the predetermined amount and (ii) the oxygen-to-uranium ratio exceeds the predetermined ratio, thereafter further contacting the product with the oxidizing agent in the second region of the vessel to further oxidize the product.

16. A process as in claim 15, wherein the predetermined amount of fluoride is no more than about 25 ppm.

17. A process as in claim 15, wherein the predetermined ratio is no more than about 2.05.

* * * * *